US010572166B1

(12) United States Patent
Douglass et al.

(10) Patent No.: US 10,572,166 B1
(45) Date of Patent: Feb. 25, 2020

(54) FIRMWARE DOWNLOAD FOR A SOLID STATE STORAGE CARD

(71) Applicant: Amazon Technologies, Inc., Seattle, WA (US)

(72) Inventors: Christopher J. Douglass, Seattle, WA (US); Sujan Biswas, Bellevue, WA (US); Tyler Huston Doornenbal, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 15/717,415

(22) Filed: Sep. 27, 2017

(51) Int. Cl.
*G06F 13/00* (2006.01)
*G06F 3/06* (2006.01)
*G06F 21/64* (2013.01)
*G06F 13/42* (2006.01)
*G06F 8/654* (2018.01)

(52) U.S. Cl.
CPC .......... *G06F 3/0623* (2013.01); *G06F 3/0632* (2013.01); *G06F 3/0659* (2013.01); *G06F 3/0679* (2013.01); *G06F 8/654* (2018.02); *G06F 13/4282* (2013.01); *G06F 21/64* (2013.01); *G06F 2213/0026* (2013.01)

(58) Field of Classification Search
CPC ............. G06F 2213/0026; G06F 21/64; G06F 13/4282; G06F 3/0679; G06F 3/0659; G06F 3/0632; G06F 8/654; G06F 3/0623
See application file for complete search history.

(56) References Cited

U.S. PATENT DOCUMENTS

| 6,125,409 | A  | * | 9/2000  | Le Roux    | G06F 13/28  |
|           |    |   |         |            | 710/12      |
| 7,904,895 | B1 | * | 3/2011  | Cassapakis | G06F 8/654  |
|           |    |   |         |            | 717/168     |
| 2006/0020758 | A1 | * | 1/2006  | Wheeler | G06F 12/0862 |
|           |    |   |         |            | 711/137     |
| 2007/0260775 | A1 | * | 11/2007 | Bita    | G06F 3/0617  |
|           |    |   |         |            | 710/36      |
| 2008/0086631 | A1 | * | 4/2008  | Chow    | G06F 8/654   |
|           |    |   |         |            | 713/2       |
| 2013/0007347 | A1 | * | 1/2013  | Fai     | G06F 9/4416  |
|           |    |   |         |            | 711/103     |
| 2013/0074178 | A1 | * | 3/2013  | Sobol   | G06F 21/78   |
|           |    |   |         |            | 726/17      |
| 2014/0325496 | A1 | * | 10/2014 | Son     | G06F 8/65    |
|           |    |   |         |            | 717/168     |
| 2017/0010821 | A1 | * | 1/2017  | Tsai    | G06F 8/654   |
| 2017/0262179 | A1 | * | 9/2017  | Suizu   | G06F 3/0679  |

* cited by examiner

*Primary Examiner* — Charles Rones
*Assistant Examiner* — Han V Doan
(74) *Attorney, Agent, or Firm* — Blank Rome LLP

(57) ABSTRACT

A solid state storage card includes flash storage devices for storing user data and a serial peripheral interface (SPI) flash storage storing a first set of machine instructions. The solid state card also includes a plurality of processor cores coupled to the flash storage devices and SPI flash storage device. Each processor includes storage for storage of a second set of machine instructions configured to cause one of the processor cores to respond to access requests for the flash storage devices. Upon power-up, no storage in the solid state card contains any of the second set of machine instructions. When executed by one of the processor cores, the first set of machine instructions causes the processor core to initiate a download of the second set of instructions from a device external to the solid state card.

18 Claims, 3 Drawing Sheets

FIRMWARE DOWNLOAD FOR A SOLID STATE STORAGE CARD

BACKGROUND

Many storage devices, such as solid state storage drives, include firmware which is executed locally on the storage device. The firmware permits the storage device to respond to configuration commands and read and write transactions. Data center service providers often include numerous storage devices for use by customers of the data center. Security of the data stored in the data center is of concern to the customers and thus to the data center service provider.

BRIEF DESCRIPTION OF THE DRAWINGS

For a detailed description of various examples, reference will now be made to the accompanying drawings in which.

DETAILED DESCRIPTION

As noted above, a data center may include one or more (and often numerous) storage devices for use by customers of the service provider that operates the data center. Storage devices that come pre-loaded with firmware may present a security issue in that the firmware is not controlled and managed by the service provider. In accordance with the disclosed embodiments, however, a storage device does not come pre-loaded with the firmware necessary to impart at least some functionality to the storage device such as the ability to respond to user read and write transactions. Without such firmware, the storage device is not usable to store data written to it by a user of the service provider, nor read data therefrom. Instead, the storage device includes volatile memory into which firmware can be downloaded to it from a host controller. The firmware to the storage device is kept stored in volatile memory in the storage device and is not stored in non-volatile memory. As such, each time the storage device is power-cycled or otherwise initialized, the host controller provides the storage device with the firmware that the storage device needs to execute.

The embodiments described herein are directed to a solid state storage media card, but are extendible to other types of storage (e.g., magnetic storage). Further, the disclosed storage device can be implemented as a printed circuit card or other types of electronics packages.

Figure 1:
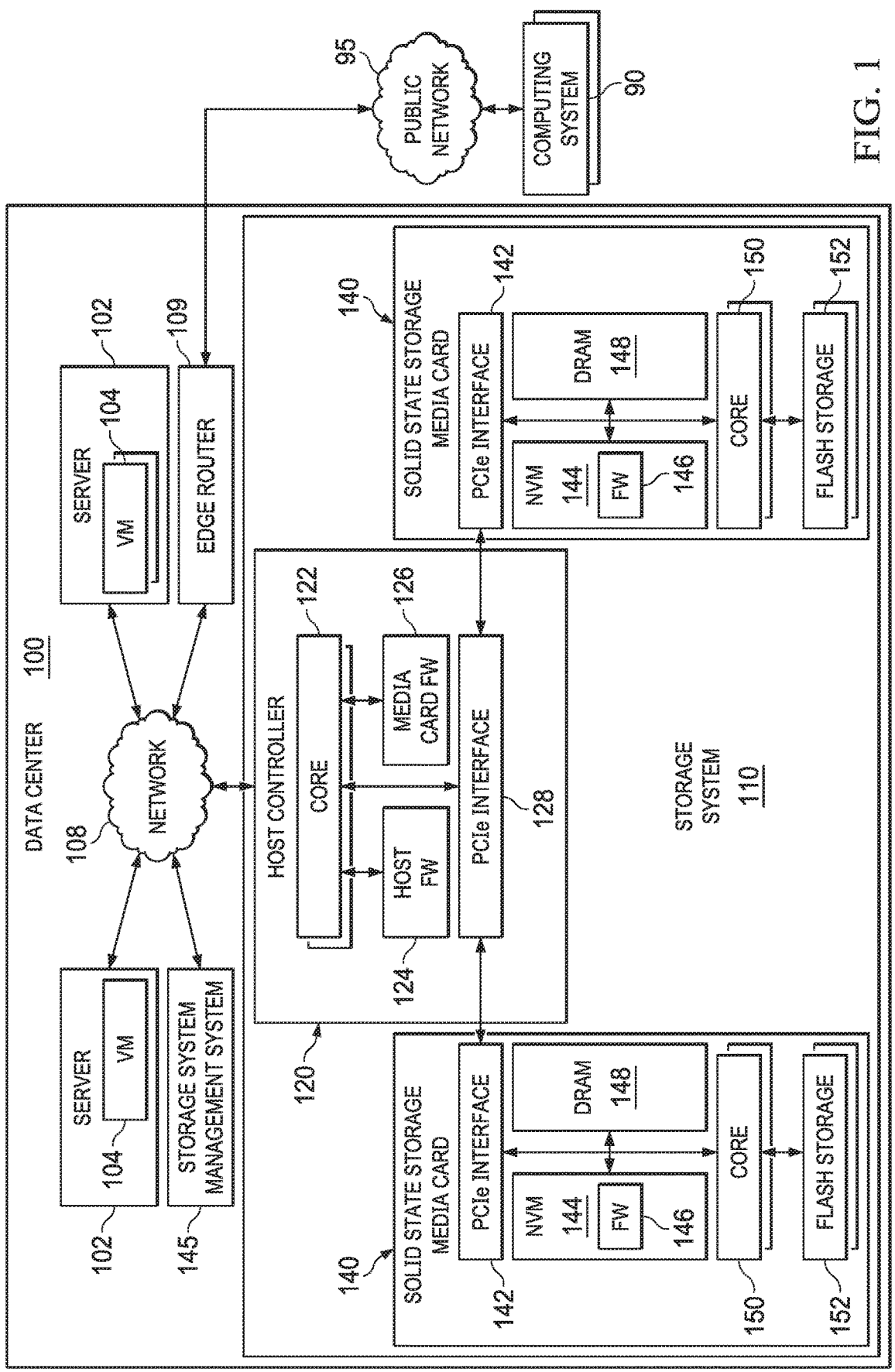
FIG. 1 shows a system comprising a storage system including one or more solid state storage media cards in accordance with various examples.

FIG. 1 shows a system in accordance with an embodiments. The illustrative system is directed to a data center 100 which is accessible by external computing systems 90 over a public network 95. The public network may comprise any of a variety of local and wide area networks, wireless networks, wired networks, the Internet, etc. The computing systems 90 may comprise personal computers, tablet devices, smart phones, or other types of network-enabled devices. Through such computing systems 90, customers of the data center 100 can access whatever services the data center provides such as the ability to create and use virtual machines to run the customers' personal and/or business software, host websites, etc., request allocations of persistent storage, and other services.

The data center 100 includes a plurality of servers 102 and a storage system 110 coupled together over an internal network 108. The internal network 108 may comprise one or more switches, routers, and other types of network devices. An edge router 109 provides network connectivity between the servers 102 and storage system 110 within the data center and the external computing systems 90. Each server 102 comprises one or more processors, memory, network interfaces, and other hardware. The servers 102 may execute one more virtual machines 104, although not all servers need be configured to execute virtual machines. Customers can access a customer management interface (not shown) to request the creation, configuration, termination, etc. of one or more virtual machines 104. A customer can have as many virtual machines 104 as desired. Software provided by the customers via computing systems 90 and/or provided by the data center itself can be downloaded to, and executed within, a virtual machine. One or more virtual machines can thus be used by a given customer perform any of a variety of operations such as hosting a website, batch processing, etc.

As shown in the example of FIG. 1, the storage system 110 includes a host controller 120 coupled to one or more solid state storage media cards 140. The solid state storage media cards 140 are field replaceable units and may be, in some cases, "hot plugged." As such, solid state storage media cards 140 can be added to, and removed from, the storage system 110 as demand for data capacity evolve over time. Further, the storage system 110 need not be powered down, although it can be powered down, to add and/or remove a solid state storage media card 140. Although two solid state storage media cards 140 are shown in the example of FIG. 1, more than two solid state storage media cards can be installed in the storage system 110 as desired.

Each solid state storage media card 140 includes one more flash memory devices 152 into which user data can be stored. The user data may comprise data generated by a customer's virtual machine 104, data directly from a customer's external computing system 90, or other user data from various services within the data center. The flash memory devices 152 comprise persistent storage (e.g., flash memory) for the user data meaning that the data stored thereon persists through a power cycle or initialization event. Each solid state storage media card also includes one or more processor cores 150, volatile memory 148 (e.g., dynamic random access memory, DRAM) 148, non-volatile memory 144, and an interface 142. The interface 152 may be implemented in accordance with the Peripheral Component Interconnect Express (PCIe) standard, although other types of interfaces may be used as well. The interface 152 provides data connectivity between the solid state storage media card 140 and the host controller. Data to be stored on a solid state storage media card 140 may be received by the host controller 120 over the internal network 108 and forwarded to the appropriate solid state storage media card 140 for storage thereon. In other embodiments, the data may bypass the host controller 120.

The host controller 120 includes one or more processor cores 122, which may be same or different from the processor cores 150 of the solid state storage media cards 140. The host controller 120 also may include storage for host firmware 124 and media card firmware 126, and may include an interface 128 compatible with the interfaces 142 of the solid state storage media cards (e.g., a PCIe interface). The host firmware 124 is executed by one or more of the processor cores 122 of the host controller 120 to cause the host controller to perform the operations describe herein. The media card firmware 126 may be provided to the host controller 120. In the example of FIG. 1, a storage system management 145 provides the media card firmware to the host controller 120 of the storage system 110 via network 108. More than one storage system 110 may be included in the data center 100 and the host controller 120 of each storage system 110 may be provided with media card firmware 126 to download to any solid state storage media card 140 installed therein.

The media card firmware 126 is executed by one or more of the processor cores 150 of a given solid state storage media card 140 to cause the media card to receive and execute configuration instructions, respond to read transaction requests, write transaction requests, etc. Without such firmware, a solid state storage media card 140 would not be usable by data center customers to store and retrieve their user data.

Different types of solid state storage media cards 140 may be installed in a given storage system 110 or may be installed in different storage systems. Further, the media card firmware may be altered from time to time (e.g., to provide enhanced functionality, fix a bug, etc.). As such, different versions of media card firmware 126 may be provided to a given storage system 110 or to different storage systems depending on the particular solid state storage media cards that are, or might be, installed therein. The host controller 120 may store multiple copies of media card firmware 126 and serve the appropriate version to a given solid state storage media card 140.

Because the non-volatile storage within a solid state storage media card 140 does not contain the firmware needed by the media card to execute read and write transactions, a solid state storage media card receives the firmware from the host controller 120. The media card firmware 126 is downloaded by the host controller 120 to volatile memory 148 within the solid state storage media card. The firmware is executed by one or more of the processor cores 150 without ever having been stored in non-volatile storage within the solid state storage media card. As such, a solid state storage media card 140 receives a download of the media card firmware 126 from a host whenever the media card is power-cycled, is reset, or otherwise enters a state in which its volatile memory loses its content. Further, a solid state storage media card newly installed in a storage system 110 receives a download of the media card firmware 126 from the host controller 120 upon the media card being powered on. Because the solid state storage media cards receive their needed firmware from a device within the data center that is controlled by the service provider that operates the data center, security is enhanced as compared to the use of solid state storage media cards that have firmware pre-loaded thereon from the factory in non-volatile storage.

The non-volatile memory 144 of each solid state storage media card 140 includes firmware 146 that assists in the download of the media card firmware 126 from the host controller 120. The firmware 146 may function to initialize the interface 142 to the host controller 120, and respond to commands from the host controller to download the media card firmware and begin its execution. However, the firmware 146 has limited and/or different functionality compared to the media card firmware 126. For example, the firmware 146 does not permit the solid state storage media card 140 to respond to read and write transaction requests for user data stored in the flash storage devices 152.

Figure 2:
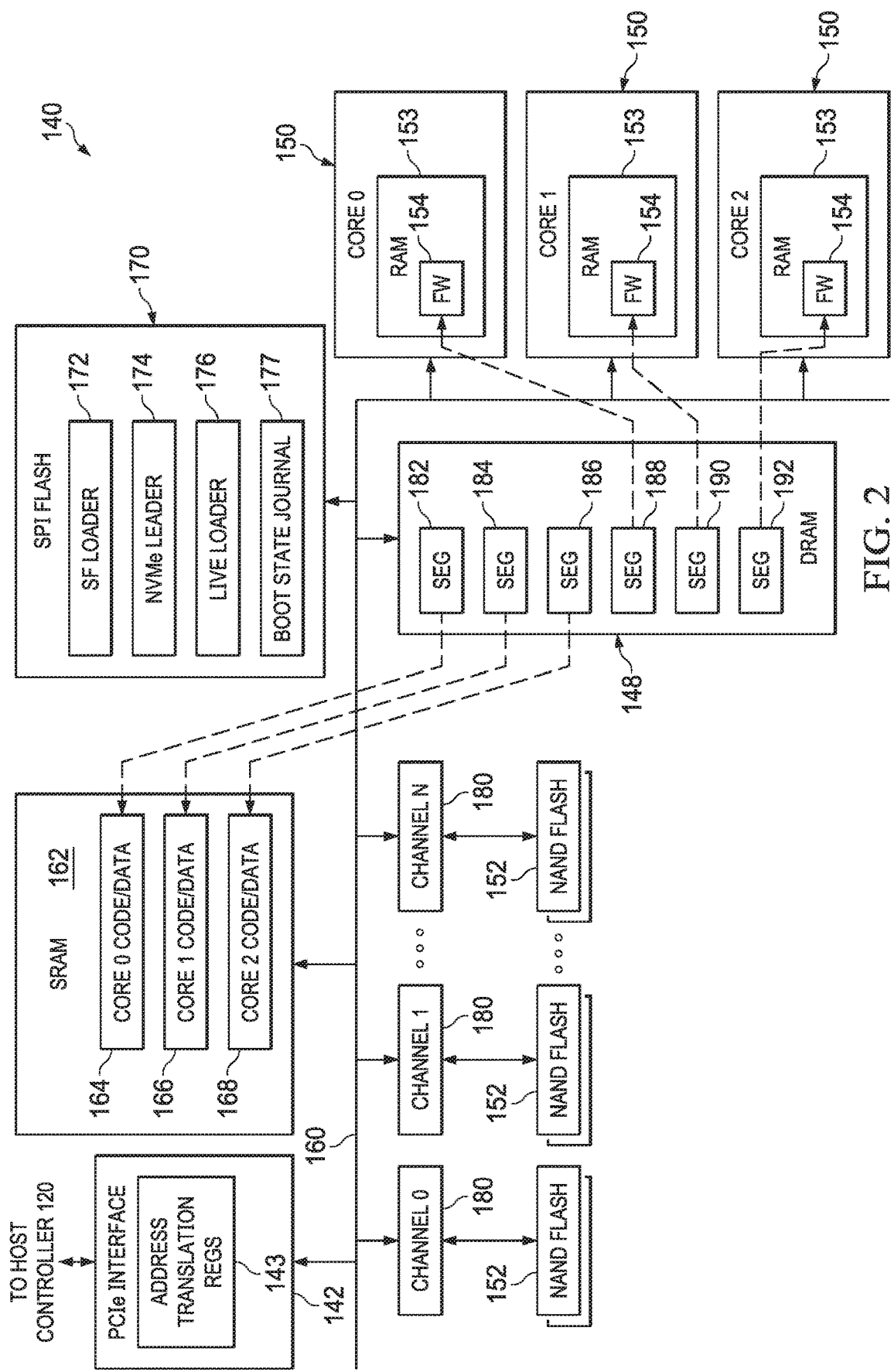
FIG. 2 shows an example architecture of a solid state storage media card in accordance with various examples.

FIG. 2 shows a block diagram of a solid state storage media card 140 in more detail, in accordance with various embodiments. As shown in this example, the solid state storage media card 140 includes the interface 142, static random access memory (SRAM) 162, flash memory 170 (in this particular embodiment, a Serial Peripheral Interface (SPI) flash memory), processor cores 150 comprising Core0, Core1, and Core2, DRAM volatile storage 148 (also termed DRAM 148), channels 180 comprising Channel 0, Channel 1, . . . , Channel n, and flash storage 152 comprising one or more NAND flash devices associated with each channel 180. In further embodiments the flash storage 152 comprises NOR flash or another type of flash storage. The NVM 144 of FIG. 1 is implemented in the example of FIG. 2 as the flash memory 170. Each channel 180 comprises a circuit to write data to the corresponding NAND flash device and read data from the NAND flash device. The various components shown are coupled together via a bus 160. The solid state storage media card 140 may include a circuit board to which the various components shown in the example of FIG. 2 are mounted.

Three process cores 150 are shown in this example, but a number of processors or processor cores other than three can be included in other embodiments. Each processor core 150 includes random access memory (RAM) 153 which comprises volatile memory for storage of firmware 154 executed by the corresponding core.

The SPI flash memory 170 includes the firmware 146 shown in FIG. 1, including multiple firmware components that perform different functions. In the depicted embodiment, these firmware components include SFLoader 172, NVMeLoader 174, and LiveLoader 176. These firmware components are executed by one of the processor cores 150 to provide the functionality described herein. For example, one of the processor cores 150 may be predetermined to be the core to execute the firmware components stored in the SPI flash 170. The SFLoader 172 is responsible for initializing and/or testing the DRAM 148 and loading the NVMe-Loader 174 into RAM (e.g., RAM 152 within a processor core 150) and validating the NVMeLoader (e.g., performing a checksum).

The NVMeLoader 174 configures the interface 142. For example, the NVMeLoader 174 configures the address translation registers 143 within the interface 142 to provide a mapping between addresses used by the host controller 120 to communicate with the solid state storage media card 140 and the internal addressing of the media card. In some embodiments a second copy of the NVMeLoader is available as a fail-over in case the first copy becomes corrupted, or to support roll-back of an update. More generally, a backup copy of each firmware component is available in case, for example, the primary copy of that component did not execute properly during a previous boot attempt. Such a failure can be determined by identifying checkpoints stored in a boot journal.

Once the interface is initialized, the LiveLoader 176 can then receive and respond to at least some commands from the host controller 120. In some embodiments, the host controller 120 issues Non-Volatile Memory Express (NVMe) protocol commands over a PCIe interface to each solid state storage media card 140. As explained above, the host controller 120 transmits the media card firmware 126 to each solid state storage media card 140. In accordance with at least one embodiment, the host controller 120 transmits NVMe commands to the solid state storage media card 140 to implement this functionality. The commands may include, for example, a firmware download command and a firmware activation command. The firmware download command specifies a path to storage accessible by the solid state storage media card that stores the firmware to be downloaded (e.g., storage within the host controller 120 as shown in FIG. 1). The solid state storage media card responds to the firmware download command by retrieving a copy of the specified firmware using the specified path. The downloaded firmware is stored in DRAM 148.

In the depicted embodiment, the firmware stored in DRAM 148 comprises a plurality of segments 182, 184, 186, 188, 190, and 192 as shown. Segments 188, 190, and 192 are to be executed by corresponding processor cores Core0, Core1, and Core2. LiveLoader 176 then copies the segments 188-192 to the RAM 152 of the corresponding processor core 150 as indicated by the dashed lines. Some of the firmware and/or data to be used by a given processor core 150 may be stored in SRAM 162. In the example of FIG. 2, segments 182-186 are copied by LiveLoader 176 to the SRAM 162 for storage therein as Core0 code/data 164, Core1 code/data 166, and Core2 code/data 168. Core0 code/data 164 can be accessed and executed by Core0 and may provide additional functionality not included in the firmware segment 188 initially loaded from the DRAM 148 directly into Core0 RAMs 152. Similarly, Core1 code/data 166 can be accessed and executed by Core1. Further, Core2 code/data 168 can be accessed and executed by Core2. The firmware downloaded from the host controller 120 into the DRAM 148 and then into the RAM 152 of the individual cores is not also stored in non-volatile memory and thus will not survive a power cycle or reset of the solid state storage media card 140. A new copy of the firmware, however, will be downloaded to the solid state storage media card 140 from the host controller 120.

In the disclosed embodiments, LiveLoader 176 has an allocation of memory separate and distinct from memory allocated to the firmware downloaded from the host controller 120. LiveLoader resides in a portion of memory reserved for use by bootloaders and is not used or modified by the firmware downloaded from the host controller 120. Because LiveLoader 176 does not depend on the execution state of the firmware from the host controller 120, the solid state storage media card 140 can readily recover from a corrupted state of the executing firmware downloaded from the host controller.

Figure 3:
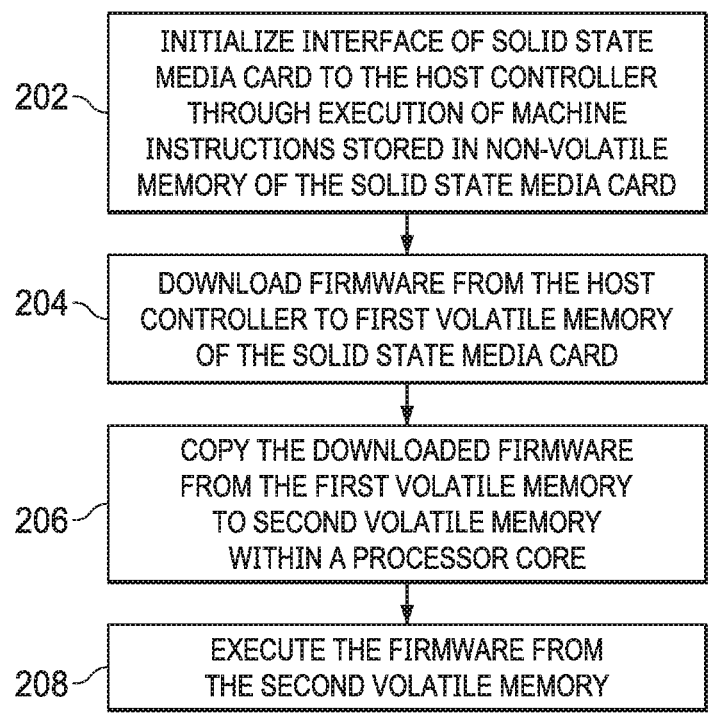
FIG. 3 shows a flow chart for downloading firmware to the solid state storage media card in accordance with various examples.

FIG. 3 includes a flow chart of an exemplary method for loading firmware into a solid state media card in accordance with an embodiment. The method may performed using embodiments of the storage system of FIG. 1 and/or the architecture of FIG. 2. The operations may be performed in the order shown, or in a different order. Further, two or more of the operations may be performed concurrently instead of sequentially. In some cases, the method of FIG. 3 is performed as a result of power cycling or resetting the solid state media card. In other embodiments, the method of FIG. 3 is performed while the solid state media card is currently executing previously downloaded firmware. Further still, in some cases, the method of FIG. 3 is performed upon detection of an error during firmware load event, in which case, a processor core may trigger a hard reset upon expiration of a watchdog timer to initiate a new firmware download.

At 202, the method includes initializing an interface on the solid state storage media card to the host controller through execution of machine instructions stored in non-volatile memory within the solid state storage media card (e.g., the SFLoader 172). Initializing the interface may include configuring a mapping between addresses.

At 204, the method includes downloading firmware from the host controller 120 to a first volatile memory of a solid state storage media card. In one example, this operation includes transmitting a first command from the host controller 120 to the solid state storage media card 140. The first command specifies a path to storage accessible by the solid state storage media card that stores the firmware to be downloaded. The first command may be a firmware download command in accordance with the NVMe protocol. The solid state storage media card responds to the command by retrieving the firmware using the path specified in the first command.

At 206, the method further includes copying the downloaded firmware from the first volatile memory to a second volatile memory within a processor core of the solid state storage media card 140. This operation may include transferring execution to LiveLoader 176 so that LiveLoader 176 can copy the firmware between the volatile memory locations. At 208, the method includes executing the firmware from the second volatile memory of the processor core. This latter operation may include modifying a program counter to point to the beginning of the firmware within the process core's memory. In some embodiments a signature of the downloaded firmware is validated before execution of the firmware begins.

In some embodiments, an activation command may be provided by the host controller to the media card to specify a desired behavior for executing the newly downloaded firmware. In one embodiment, the activation command may include an activation value that indicates that the downloaded firmware is to be executed upon a subsequent reset of the solid state storage media card. Alternatively, the activation command may include an activation value that specifies that the retrieved firmware is to be executed without waiting for a reset of the solid state storage media card. This latter type of activation is a live update of the firmware in that a change is made from the execution of one firmware copy to another without power cycling or resetting the solid state storage media card. Once the new firmware is provided to the solid state storage media card and the various segments of the firmware are parsed and loaded into the volatile memories as described above, LiveLoader 176 modifies the program counter of the processor core(s) 150 to begin execution of the new firmware at the memory address of the new firmware in volatile memory.

The host controller 120 may temporarily store all incoming access requests for the solid state storage media card 140 whose firmware is being downloaded and before execution of the new firmware begins. Further, the host controller 120 may wait for all transactions in flight (if any) within the solid state storage media card to complete before beginning the process of downloading new firmware to the media card. Once the new firmware begins execution, the temporarily stored access requests may be transmitted to the solid state storage media card 140 for completion. In other embodiments, the temporary buffering of the incoming access requests may occur within a queue internal to the solid state storage media card 140. In at least some embodiments the link between the host controller 120 and the solid state storage media card 140 stays live during firmware transitions, so the link is configured by the NVMeLoader 174. Subsequent firmware detects the presence of the link and does not reset the interface.

In some embodiments, a solid state storage media card maintains a boot state journal in which information pertaining to boot attempts is stored. The boot state journal may reside in the SPI flash memory 170 and is shown as boot state journal 177 in the example of FIG. 2. Each entry in the boot state journal 177 may include a sequence number that is incremented for each journal entry, an originator which is a one-byte tag indicating the party within the solid state storage card that recorded the event (e.g., an identifier of the NVMe Loader 174) that attempted the boot process), and an event identifier which is a tag enumerating an event type code that provides metadata about the nature of the boot attempt. The host controller 120 may transmit a "get log page" command to a solid state storage media card 140 to request a copy of the boot state journal 177. The get log page command also may be used by the host controller 120 to retrieve other log data such as debug data, crashdump data, etc. Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A storage system, comprising:
 a host controller including a first processor core and memory, wherein the memory includes host controller firmware executable by the first processor core and includes storage card firmware;
 a solid state storage card, comprising:
  flash memory for storing user data;
  a serial peripheral interface (SPI) flash storage storing a first set of machine instructions; and
  a second processor core coupled to the flash memory and SPI flash storage, the second processor core includes storage for a second set of machine instructions configured to cause the second processor core to respond to access requests for the flash memory;
 wherein, upon powering on the solid state storage card, no storage in the storage card contains any of the second set of machine instructions;
 wherein, when executed by the second processor cores, the first set of machine instructions causes the second processor core to download the second set of instructions from the host controller to the solid state storage card; and
 wherein at least one of the host controller or the solid state storage card is configured to receive and store incoming access requests for the solid state storage card while the second set of machine instructions is being downloaded from the host controller to the solid state storage card, and upon completion of the download of the second set of machine instructions, the processor core of the solid state storage card is configured to execute the received and stored incoming access requests.

2. The storage system of claim 1, wherein the solid state storage card includes a plurality of processor cores and dynamic random access memory (DRAM) into which the downloaded second set of instructions is stored, wherein the downloaded second set of instructions comprises a plurality of segments, and wherein, when executed by one of the processor cores, the first set of instructions cause that processor core to copy each segment into the storage of a corresponding processor core for execution by the corresponding core to respond to access requests for the flash storage devices.

3. The storage system of claim 1, wherein the solid state storage card includes an electrical interface, and wherein the first set of instructions causes the second processor core to initialize the electrical interface to thereby download the second set of instructions from the host controller to the solid state storage card.

4. The storage system of claim 1, wherein, the first set of instructions, when executed, cause the second set of instructions to be downloaded and executed without resetting the solid state storage card.

5. The storage system of claim 1, wherein after powering on but before the second set of instructions is downloaded from the host controller, the processor core cannot perform a read or write request for user data.

6. The storage system of claim 1, wherein the solid state storage card includes a Peripheral Component Interconnect Express (PCIe) interface for connection to the host controller, and wherein the first set of instructions use the Non-Volatile memory Express (NVMe) protocol over the PCIe interface for downloading the second set of instructions from the host controller.

7. An apparatus, comprising:
 a circuit board;
 a processor core mounted on the circuit board;
 flash memory mounted on the circuit board;
 volatile memory mounted on the circuit board; and
 non-volatile memory mounted on the circuit board;
 wherein, upon initialization of the apparatus, the apparatus is configured to receive, from a host controller coupled to the circuit board, a copy of storage card firmware for storing in the volatile memory, wherein the storage card firmware is for execution by the processor core without storing the storage card firmware into non-volatile memory; and
 wherein the flash memory is configured to store a boot state journal, wherein for each initialization cycle, the boot state journal is configured to include a sequence number and an event identifier, the event identifier associated with metadata for the respective initialization cycle.

8. The apparatus of claim 7, further comprising a Peripheral Component Interconnect Express (PCIe) interface over which the host controller couples to the circuit board.

9. The apparatus of claim 7, wherein the apparatus is configured to receive host controller commands in accordance with a Non-Volatile memory Express (NVMe) protocol.

10. The apparatus of claim 9, wherein the apparatus receives a first NVMe command from the host controller to download the storage card firmware.

11. The apparatus of claim 10, wherein the apparatus receives a second NVMe command from the host controller to begin execution of the downloaded storage card firmware.

12. The apparatus of claim 7, wherein, while the processor core is executing the storage card firmware, the apparatus receives another version of storage card firmware for execution by the processor core.

13. The apparatus of claim 12, wherein the another version of storage card firmware is downloaded without storage in the non-volatile memory within the apparatus.

14. The apparatus of claim 7, wherein the storage card firmware causes the processor core to respond to read and write transactions for flash storage.

15. The apparatus of claim 7, further comprising flash storage for storage of user data, wherein when the apparatus undergoes a power cycle, the user data on the flash storage persists through the power cycle, and the host controller downloads another copy of the storage card firmware to the volatile memory of the power-cycled apparatus for execution by the processor core without storing the storage card firmware into the non-volatile memory.

16. A method, comprising:
   while executing a first firmware on a solid state storage card, downloading a second firmware from a host controller to a first volatile memory of the solid state storage media card;
   transmitting a second command from the host controller to the solid state storage card, the second command includes an activation value that indicates that the second firmware is to be executed upon a subsequent reset of the solid state storage card;
   invoking a set of instructions on the solid state storage card, the set of instructions having an allocation of memory separate from memory allocated to the first firmware, wherein the set of instructions cause copying of the second firmware from the first volatile memory to second volatile memory within a processor core of the solid state storage card; and
   following a reset of the solid state storage card, executing the second firmware from the second volatile memory of the processor core.

17. The method of claim 16, wherein downloading the second firmware comprises:
   transmitting a first command from the host controller to the solid state storage card, wherein the first command specifies a path to storage accessible by the solid state storage card that stores the second firmware to be downloaded; and
   retrieving by the solid state storage card the second firmware using the path.

18. The method of claim 16, further comprising, following a reset of the solid state card but before downloading the second firmware, initializing an interface on the solid state storage card to the host controller through execution of machine instructions stored in non-volatile within the solid state storage card, and wherein downloading the second firmware comprises receiving the second firmware into the first volatile memory over the initialized interface.

* * * * *